INVENTORS
D. J. FONTENOT
F. W. SKRABA
BY Young & Quigg
ATTORNEYS

Nov. 12, 1968   D. J. FONTENOT ET AL   3,410,759
HF ALKYLATION ACID RERUN TOWER

Filed Nov. 21, 1966   3 Sheets-Sheet 3

INVENTORS
D. J. FONTENOT
F. W. SKRABA
BY
*Young + Quigg*
ATTORNEYS

United States Patent Office 3,410,759
Patented Nov. 12, 1968

3,410,759
HF ALKYLATION ACID RERUN TOWER
Delouis J. Fontenot and Frank W. Skraba, Sweeny, Tex., assignors to Phillips Petroleum Company, a corporation of Delaware
Filed Nov. 21, 1966, Ser. No. 595,901
1 Claim. (Cl. 202—158)

ABSTRACT OF THE DISCLOSURE

In an HF rerun column having a top portion and a leg, the baffles in the leg are intimately attached to the inner wall of the leg and slope slightly downward. Interposed between the top portion of the column and the leg of the column is a plate having a closed section and an opening, the opening substantially corresponding in size and shape to the size and shape of the top baffle, this opening being disposed just over the top baffle, so as to direct the flow of HF-rich oil directly onto the top baffle. A means for introducing stripping vapor is positioned just below the bottom baffle. In a preferred embodiment the baffles have rods running in the direction of liquid flow in order to facilitate the even distribution of the material being stripped.

---

This invention relates to improvements in the leg of an HF rerun column in a hydrogen fluoride catalyzed alkylation system.

Hydrogen fluoride, that is hydrofluoric acid, is widely used as a catalyst in the alkylation of low boiling paraffinic hydrocarbons, particularly isobutane and/or isopentane with alkylating reagents, particularly low-boiling olefins such as propylene, various butylenes, and/or various amylenes to form normally liquid paraffins having high octane numbers. The reaction is carried out by introducing a suitable amount of makeup and regenerated hydrofluoric acid, which with recycled acid, provides a hydrocarbon to acid catalyst ratio of about 1:1 to 10:1 on a liquid volume basis. This mixture is intimately admixed in a reaction zone and the resulting mixture passed to a settling zone wherein a phase separation between the liquid hydrocarbon phase and the liquid hydrofluoric acid phase is readily obtained. The hydrofluoric acid phase is withdrawn from the settling zone and most of it returned to the alkylation zone. A small portion, generally within the range of about 1 to about 10 percent by volume, of the acid phase is passed to an acid separation tower (HF rerun column) for purification. This acid phase contains—in addition to the HF to be recovered—water, a high-boiling organic material generally referred to as acid soluble oil or just "oil," and minor amounts of other impurities. It is not possible to effect a complete stripping of the HF from the acid soluble oil and other impurities; thus much valuable acid is not recovered but rather is discarded with the waste materials of the kettle product. For instance, in a commercial scale plant, as much as a thousand pounds of HF may be lost each day.

It is an object of this invention to provide an improved leg for an HF rerun column whereby more efficient stripping of the HF is possible.

In accordance with this invention the baffles in the leg of an HF rerun column are positioned so as to insure contact at every baffle between the oil to be stripped and the stripping vapor.

In the drawings, forming a part hereof, in which like reference characters in the various views represent like elements:

Figure 1:
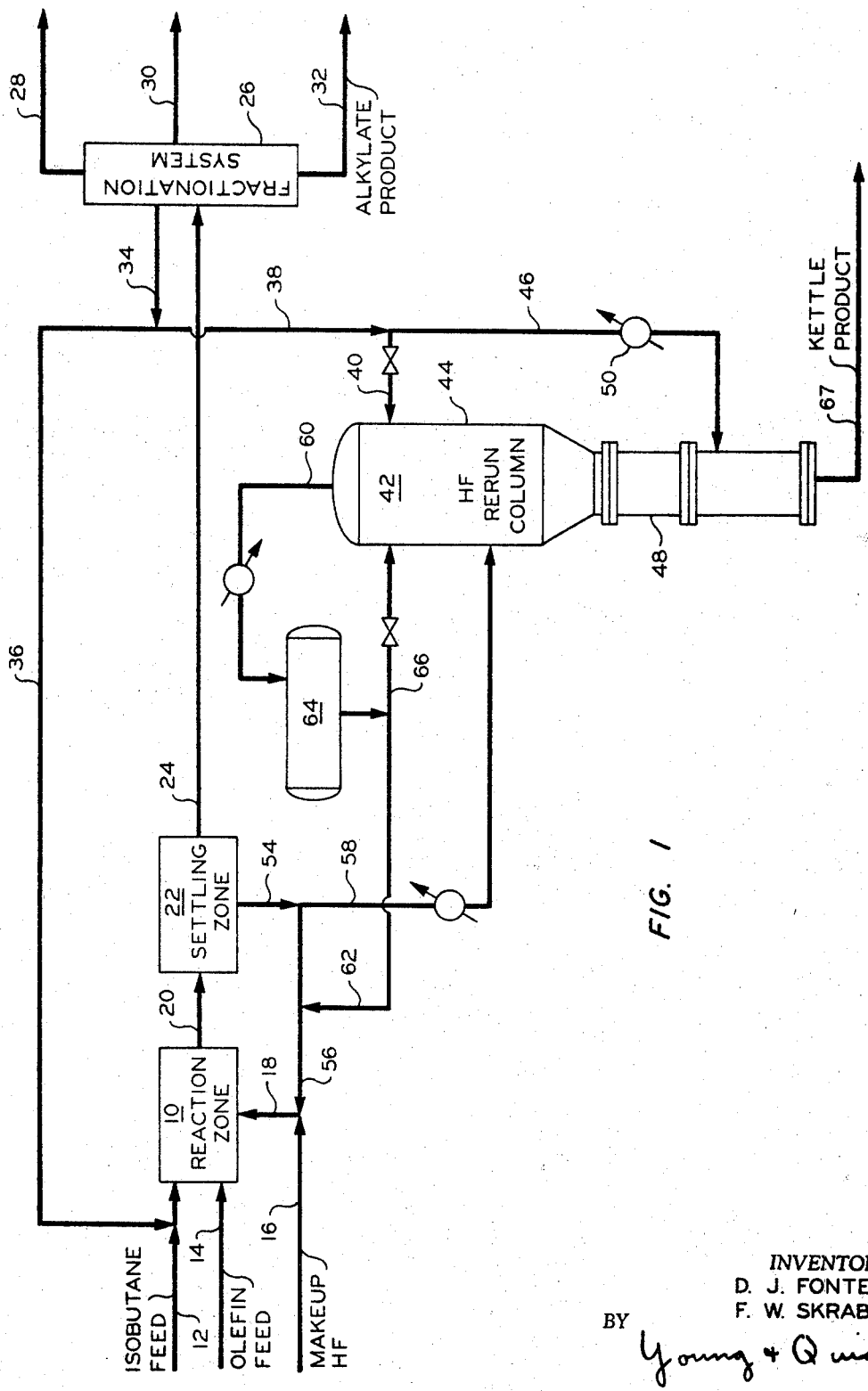
FIGURE 1 is a diagrammatic flow plan of an alkylation system including an HF rerun column.

Referring now to FIGURE 1, feed comprising isobutane is introduced into the reaction zone 10 via conduit 12. Olefin feed is introduced into the reaction zone via conduit 14. Makeup HF from conduit 16 is fed into the reaction zone via conduit 18. The effluent from the reaction zone passes via conduit 20 to settling zone 22. The hydrocarbon phase is withdrawn via conduit 24 and passed to fractionation system 26 which usually is made up of several fractionation towers. Propane is taken off via conduit 28, normal butane is removed via conduit 30, and an alkylate is removed via conduit 32. Isobutane is removed via conduit 34 which splits into conduit 36 which recycles a portion of the isobutane to the reaction zone, and conduit 38 which further splits into conduit 40 which introduces a portion of the isobutane into the top portion 42 of HF rerun column 44, and conduit 46 which introduces hot isobutane vapor into the leg 48 of the HF rerun column. A heater 50 in line 46 heats the isobutane to the proper temperature to produce the vapor for stripping HF from the oil and other impurities. The HF mixture from the settling zone is withdrawn via conduit 54 which splits into conduit 56 which recycles a portion of the crude HF back to the reaction zone via conduit 18, and conduit 58 which introduces the remaining portion of the HF mixture into the top portion of the HF rerun column. Isobutane containing the purified HF is taken off the top of the HF rerun column via conduit 60 and returned to the reaction zone via conduits 62, 56 and 18. A portion of the isobutane containing the purified HF may be fed from accumulator 64 back to the top of the rerun column as a reflux via conduit 66. Generally, if this reflux is used, no isobutane is fed in through conduit 40 or, if isobutane is fed in through conduit 40, no isobutane containing the purified HF is refluxed back into the HF rerun column. Kettle product comprising acid soluble oils and some isobutane is removed from the bottom via line 67.

Figure 2:
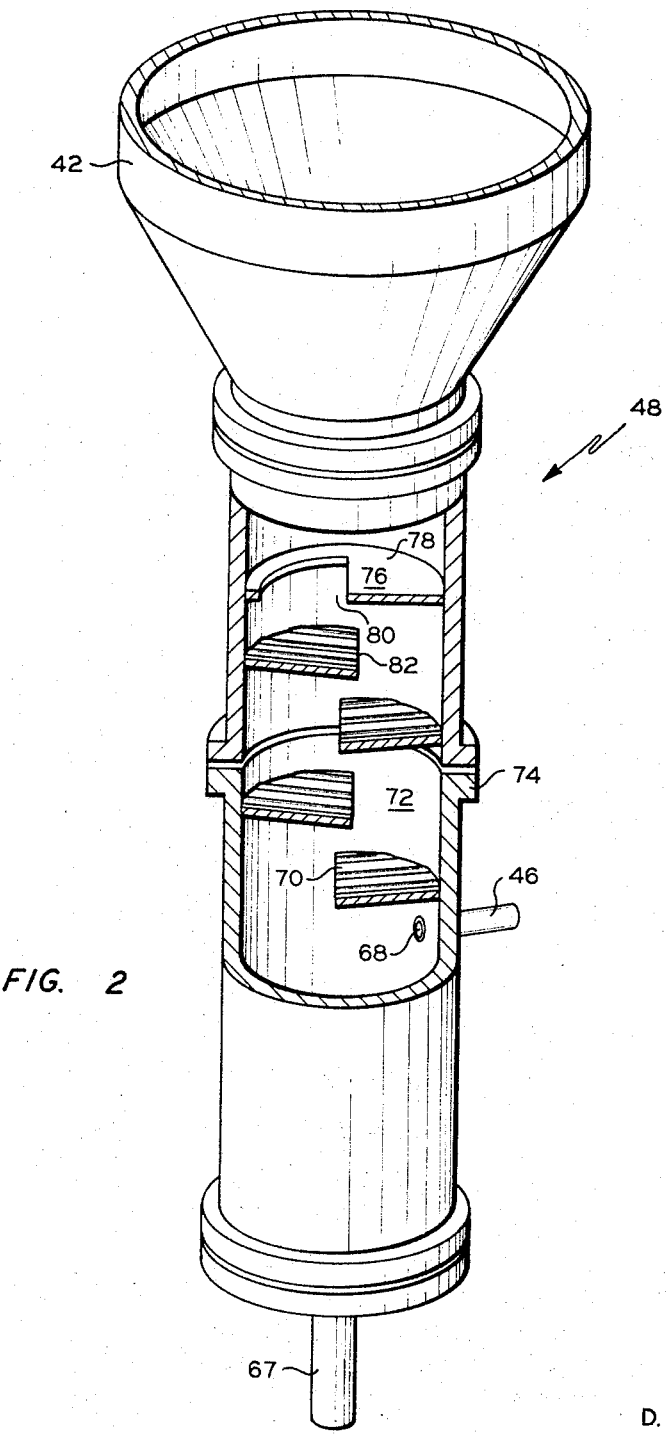
FIGURE 2 is an axonometric view in simplified form of the leg portion of the HF rerun column with parts broken away.

Referring now to FIGURE 2 there is shown the leg 48 of the HF rerun column with parts broken away to show the novel construction of the interior. Line 46 carrying hot isobutane stripping vapors communicates with the interior of the leg via stripping vapor inlet orifice 68 positioned just below the bottom face of baffle 70, said line forming a means for introducing stripping vapor into the column. The baffles are shown welded to the wall 72 of the leg. Ring joint 74 makes possible easy disassembly for cleaning and inspection. Interposed between the top portion 42 of the HF rerun column and the leg 48 is a plate 76 which connects said top portion with said leg. This plate is so oriented that opening 80 is over the top baffle 82 thereby allowing communication between said top portion and said leg. Closed portion 78 restricts the opening communicating between the upper portion and the leg of the HF rerun column so as to divert the flow of HF-rich oil directly onto the top baffle 82.

Figure 3:
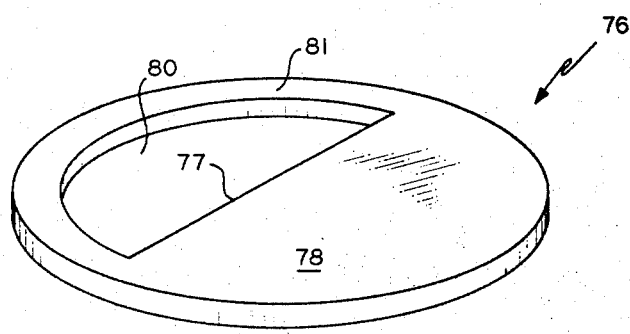
FIGURE 3 is a plan view of a segmental orifice.

FIGURE 3 shows the segmental orifice in greater detail. Closed portion 78 covers one half of the plate, edge 77 being coincident with the diameter. The other half of the plate comprises flange 81 and semicircular opening 80.

Figure 4:
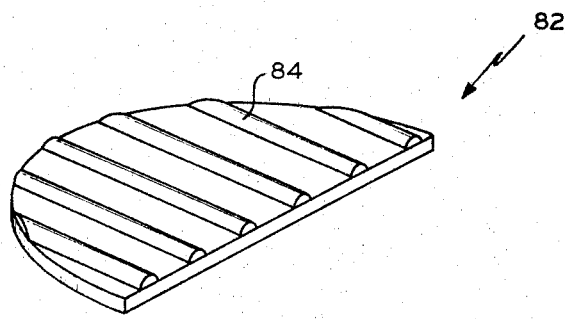
FIGURE 4 is an axonometric view of a baffle.

FIGURE 4 shows upper baffle 82 which is identical to the other three baffles. Rods 84 are intimately affixed to the top surface of the baffle and serve to improve the flow distribution of the HF-rich oil.

It is apparent that the accompanying drawings, particularly FIGURE 1, are somewhat simplified in that many parts such as valves, pumps, and other conventional equipment are not shown. However, their inclusion is understood by those skilled in the art and is within the scope of the invention.

The baffles slope downward from the horizontal at an angle of between about 2 and about 10 degrees, preferably about 5 degrees. This gradual slope—as opposed to the usual steeper slope—allows more residence time for the HF-rich oil on the baffles thus allowing the oil to become hotter and thereby make it easier to strip the HF from the used HF-rich oil.

The baffles are intimately affixed to the walls of the leg so as to prevent the HF-rich oil from running straight down the inner wall of the leg. For instance, this can be done by welding the baffles directly to the inner wall of the leg.

The baffles have means such as rods welded to the upper surface to insure even distribution of the HF-rich oil as it flows down the baffle and over the edge of the baffle. Other suitable means for insuring even distribution of the oil include using a baffle with a corrugated upper surface.

The features of this invention are applicable to HF rerun column legs having any number of baffles. However, the features whereby the segmental orifice directs the flow of HF-rich oil directly on the top baffle to prevent any substantial amount of such oil from bypassing said top baffle, and the stripping vapor inlet orifice is positioned just below the bottom baffle to prevent any substantial part of the stripping vapors from bypassing the oil falling from said bottom baffle, result in more effective utilization of the top and bottom baffles. Thus it is apparent that these features effect greater percentage improvement with systems employing a small number of baffles such as the system described in the drawings where only four baffles are used. As few as two baffles can be used.

The stripping vapor inlet orifice will be positioned below the area where the lower baffle is affixed to the wall a distance equal to about 0.01 to about 1 times the radial length of one baffle, generally about one-half the radial length. By radial length is meant the maximum length in the direction of liquid flow.

The novel HF rerun column leg of the instant invention has been described in the figures in use in an alkylation unit utilizing an isobutane feed. While it is of utility in any HF catalyzed alkylation unit, for instance one utilizing an isopentane feed, isobutane is the feed normally employed in current commercial practice. If a different feed were used, then, of course, the stripping vapors would be different since the stripping vapors are a portion of the isoparaffin used. It is also possible for all the isobutane from the fractionation system to be recycled to the reaction zone and the stripping vapors obtained from another source, for instance by using line 46 to feed the fresh or charge isobutane into the system.

The leg 48 is preferably insulated to reduce heat loss and may even have heating jackets to add additional heat.

EXAMPLE

Control

Isobutane was fed to an HF catalyzed alkylation plant such as is shown in FIGURE 1, except that the HF rerun column leg had baffles with a smooth upper surface which were held in the leg by means of racks. These baffles sloped downward at an angle of 15 degrees from the horizontal. The HF-rich oil entered the top of the leg through a circular orifice with an opening approximately the diameter of the upper part of the leg, and the stripping vapors entered the leg through an orifice which was on the opposite side of the wall from the side to which the lower baffle was affixed. Over a six month period HF losses averaged 33,744 pounds per month.

RUN 1

The HF leg of the plant described in the control was modified by welding ⅛-inch metal rods at 3-inch intervals along the top side of each baffle in the direction of liquid flow. These baffles were welded to the inner wall of the leg so as to slope downward at an angle of 5 degrees from the horizontal. A segmental orifice such as is shown in FIGURE 3 was installed between the top portion of the HF rerun column and the leg so as to direct the flow of substantially all of the oil directly onto the first baffle, and the orifice admitting the stripping vapors was positioned under the lower baffle at a point 8 inches below where the lower baffle was attached to the inner wall of the leg. The maximum length of the baffle in the direction of liquid flow was 14½ inches, thus this orifice was positioned below the baffle a distance equal to approximately one-half a baffle length. The leg was 23 inches in diameter, thus the baffle extended slightly beyond the center of the leg. The apparatus was otherwise as nearly as possible identical, the process conditions were as nearly as possible identical, and the total alkylate output of the plant was substantially the same as in the control. Identical reactants as in the control were used, but the HF loss over a six-month period averaged only 23,484 pounds per month. This is a savings of 10,260 pounds per month of HF previously lost.

We claim:
1. An HF rerun column comprising in combination:
 a vertically disposed elongated top portion having an upper end and a lower end;
 means for introducing crude HF at a point intermediate between said upper and said lower ends;
 means in said upper end for removing purified HF;
 a leg smaller in diameter than said top portion, having an upper end and a lower end, said upper end of said leg having means in communication with said lower end of said elongated top portion;
 means for removing kettle product from said lower end of said leg;
 a plurality of baffles including a top baffle and a bottom baffle attached to the inner wall of said leg, said baffles sloping downwardly at an angle of 5 degrees from the horizontal and having on the upper surface thereof rods running in the direction of liquid flow to effect even distribution of liquid being stripped, said baffles being alternately disposed on opposite sides of said leg, said top baffle being semicircular in shape;
 a plate having a closed section and an opening, said plate being interposed between, and connecting, said top portion and said leg of said column, said plate having said opening above said top baffle, said opening being semicircular and corresponding in size and shape to the size and shape of said top baffle; and
 means in said leg for introducing stripping vapor, said means positioned below said bottom baffle and down from the point where said bottom baffle is affixed to a wall of said leg a distance equal to 0.01 to 1 times the radial length of said baffle.

References Cited

UNITED STATES PATENTS 2,394,133   2/1946   Zimmerman _____ 261—110
2,914,590  11/1959   Van Pool _____ 260—683.48 XR

FOREIGN PATENTS 123,171   8/1900   Germany.
 12,384    1902    Great Britain.

RONALD R. WEAVER, *Primary Examiner.*